(12) United States Patent
Saeed et al.

(10) Patent No.: US 10,210,595 B2
(45) Date of Patent: Feb. 19, 2019

(54) PRODUCING AND USING DATA ACCORDING TO FIRST AND SECOND DIFFERENT PATTERNS IN DATA PROCESSING SYSTEMS

(71) Applicant: ARM Limited, Cambridge (GB)

(72) Inventors: Sharjeel Saeed, Cambridge (GB); Daren Croxford, Cambridge (GB); Kushan Vijaykumar Vyas, Cambridge (GB)

(73) Assignee: Arm Limited, Cambridge (GB)

( * ) Notice: Subject to any disclaimer, the term of this patent is extended or adjusted under 35 U.S.C. 154(b) by 11 days.

(21) Appl. No.: 15/438,663

(22) Filed: Feb. 21, 2017

(65) Prior Publication Data
US 2017/0256027 A1 Sep. 7, 2017

(30) Foreign Application Priority Data
Mar. 2, 2016 (GB) .................................. 1603632.9

(51) Int. Cl.
*G06T 1/60* (2006.01)
*G09G 5/36* (2006.01)
*G09G 5/00* (2006.01)
*G06T 1/20* (2006.01)
(Continued)

(52) U.S. Cl.
CPC .................. *G06T 1/60* (2013.01); *G06T 1/20* (2013.01); *G06T 3/60* (2013.01); *G09G 5/00* (2013.01); *G09G 5/363* (2013.01); *G09G 3/3611* (2013.01)

(58) Field of Classification Search
CPC .... G06T 1/20; G06T 1/60; G06T 3/60; H04N 21/4436; G06F 1/3237; G06F 1/3287; G09G 2330/021; G09G 2360/08
See application file for complete search history.

(56) References Cited

U.S. PATENT DOCUMENTS

| 5,760,784 A | * | 6/1998 | Bullis | ........................ G06T 9/00 345/660 |
| 5,790,714 A | * | 8/1998 | McNeil | ................. G06T 3/4007 348/581 |
| 6,363,464 B1 | | 3/2002 | Mangione | |

(Continued)

FOREIGN PATENT DOCUMENTS

| GB | 2543736 A | 5/2017 |
| JP | 09055853 | 2/1997 |

OTHER PUBLICATIONS

GB Combined Search and Examination Report dated Aug. 8, 2016, GB Patent Application GB1603632.9.

*Primary Examiner* — Jeffery A Brier
(74) *Attorney, Agent, or Firm* — Vierra Magen Marcus LLP

(57) ABSTRACT

A method of operating a data processing system 4 comprises a first processing stage 11, 12 of the data processing system producing data according to a first pattern, and a second processing stage 20 of the data processing system using the data produced by the first processing stage 11, 12 according to a second different pattern. The data processing system 4 deactivates the first processing stage 11, 12 when the first processing stage 11, 12 has produced a set of data that includes sufficient data to allow the set of data to be used by the second processing stage 20 according to the second pattern, and re-activates the first processing stage 11, 12 based on the use of that set of data by the second processing stage 20.

31 Claims, 8 Drawing Sheets

(51) Int. Cl.
  *G06T 3/60*   (2006.01)
  *G09G 3/36*   (2006.01)

(56) References Cited

U.S. PATENT DOCUMENTS

| | | | |
|---|---|---|---|
| 2004/0032520 A1* | 2/2004 | Andersson | H04N 3/1512 348/308 |
| 2008/0229078 A1* | 9/2008 | Abernathy | G06F 1/3228 712/219 |
| 2009/0172458 A1* | 7/2009 | Yamada | G06F 1/3203 713/600 |
| 2014/0118376 A1* | 5/2014 | Hakura | G06T 17/20 345/545 |
| 2016/0041207 A1* | 2/2016 | Cheng | G06F 1/28 307/131 |

\* cited by examiner

PRODUCING AND USING DATA ACCORDING TO FIRST AND SECOND DIFFERENT PATTERNS IN DATA PROCESSING SYSTEMS

BACKGROUND

The technology described herein relates to data processing systems, and in particular to the processing of data when generating an image for display on a display in a data processing system.

In data processing systems, it can often be the case that data is generated or otherwise provided in a format that is different to a format that is subsequently required. This may be the case, for example, when processing an image for display. In this case, data in respect of an image to be displayed may be generated in an initial format, such as in the form of plural two-dimensional blocks (arrays) of data positions (e.g. "tiles"), but may be further processed and/or provided to a display (such as a display panel) in the form of plural one-dimensional lines of data positions (e.g. raster lines).

In such arrangements, the data processing system must effectively convert from one format to the other. This can be achieved, for example, by writing the data in its initial format (e.g. as blocks of data) to storage such as a buffer, and then reading the data out from the storage, e.g. buffer, in the other format (e.g. as lines of data). In other words, data may be generated and written to a buffer in one format or pattern, and then "consumed" from the buffer in another, different, format or pattern.

One exemplary such arrangement is in a display controller, where input blocks (arrays) of data are used (consumed) in the form of raster lines (e.g. when generating output frames for display on a display).

The Applicants believe that there remains scope for improvements to data processing systems that operate in this manner.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
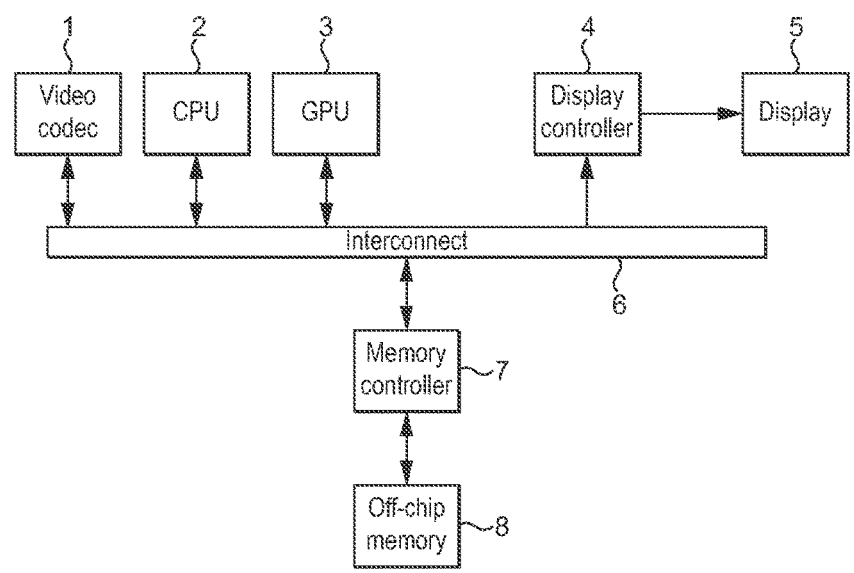
FIG. 1 shows schematically a data processing system in accordance with an embodiment of the technology described herein.

A first embodiment of the technology described herein comprises a method of operating a data processing system, the method comprising:

a first processing stage of the data processing system producing data according to a first pattern; and a second processing stage of the data processing system using the data produced by the first processing stage according to a second different pattern;

the method further comprising the data processing system:

deactivating the first processing stage when the first processing stage has produced a set of data, the set of data including sufficient data to allow the set of data to be used by the second processing stage according to the second pattern; and re-activating the first processing stage based on the use of the set of data by the second processing stage.

A second embodiment of the technology described herein comprises a data processing system comprising:

a first processing stage operable to produce data according to a first pattern; and a second processing stage operable to use the data produced by the first processing stage according to a second different pattern;

wherein the data processing system is operable to:

deactivate the first processing stage when the first processing stage has produced a set of data, the set of data including sufficient data to allow the set of data to be used by the second processing stage according to the second pattern; and re-activate the first processing stage based on the use of that set of data by the second processing stage.

The technology described herein is concerned with a method of operating a data processing system in which a first processing stage produces data according to a first pattern, and a second processing stage uses (i.e. consumes) that data according to a second different pattern. In the technology described herein, the first processing stage is deactivated when the first processing stage has produced a particular set of data (according to the first pattern), and the first processing stage is then activated (i.e. re-activated) based on the use of that set of data by the second processing stage.

As will be appreciated by those having skill in the art, deactivating the first processing stage in the manner of the technology described herein (e.g., and in an embodiment, "clock gating" the first processing stage) has the effect of reducing the power consumption of the data processing system.

Furthermore, and as will be described in more detail below, by activating (i.e. re-activating) the first processing stage based on the use of the set of data by the second processing stage, the first processing stage can be deactivated without adversely affecting the overall operation of the data processing system, e.g., and in an embodiment, without ever starving the second processing stage of data for its use.

Thus, for example (and in an embodiment), after the first processing stage has produced a set of data and has been deactivated, and while that set of data is being used by the second processing stage, the first processing stage may be re-activated at or close to the point at which the time taken for the first processing stage to produce a further set of data is equal to or sufficiently similar to the time taken for the second processing stage to use the remaining data of the (already produced) set of data. This ensures that the second processing stage is not starved of data for its use, while maximising (or at least increasing) the amount of time for which the first processing stage can be deactivated (and, correspondingly, any resulting power savings).

Moreover, the Applicants have realised that where the pattern according to which the data is produced is different from the pattern according to which the data is used (consumed), the set of data that is produced (according to the first pattern) before the data producing (first) processing stage is deactivated should include sufficient data to allow the set of data to be used according to the second (different) pattern (and so this is done in the technology described herein). For example, where data is produced in the form of blocks and then consumed in the form of lines, the data producing (first) processing stage should be, and in an embodiment is, controlled to produce an appropriate line width of blocks before that processing stage is deactivated.

This then allows the set of data to be consumed (e.g. in the form of lines) "independently", i.e. without requiring the production of further data while that set of data is being consumed. This in turn again has the effect of maximising (or at least increasing) the amount of time for which the first processing stage can be deactivated (and, correspondingly, any resulting power savings).

It will be appreciated, therefore, that the technology described herein provides an improved data processing system and method of operating a data processing system.

The first processing stage of the technology described herein may comprise any suitable and desired processing stage that is operable to produce data according to a first pattern. The first processing stage may comprise, for example, a decoder, a rotation stage, a graphics processing unit (GPU), a central processing unit (CPU), a video codec, a compositor, etc.

There may be a single first processing stage or there may be plural first processing stages operable to produce data according to the first pattern. Where there are plural first processing stages, then each first processing stage is in an embodiment operated in the manner of the first processing stage of the technology described herein.

The data produced by the first processing stage and used by the second processing stage may comprise any suitable and desired data that may be produced by a data processing system. In an embodiment, the data comprises one or more arrays of data. The or each array of data in an embodiment comprises an array of plural data positions, with each data position taking a particular data (e.g. colour) value. In an embodiment, the data comprises image data, i.e. one or more arrays of image (colour) data, e.g. one or more frames, for display or otherwise.

In an embodiment, the data produced by the first processing stage and used by the second processing stage takes the form of (comprises) plural data words (e.g. such as plural Advance eXtensible Interface (AXI) words), where each word in an embodiment includes data in respect of multiple data positions of the data array.

The data produced by the first processing stage is produced according to a first pattern. The first pattern may comprise any suitable and desired pattern according to which data may be produced.

In an embodiment, the first processing stage is operable to produce data in the form of plural blocks of data, where each block of data represents a particular region (area) of an array of data. Each block of data should, and in an embodiment does, comprise at least two rows and at least two columns of data positions of the data array.

Thus, in an embodiment, the or each array of data produced by the first processing stage is divided or partitioned according to the first pattern into a plurality of identifiable smaller regions each representing a part of the overall array, and that can accordingly be represented as blocks of data.

The sub division of the or each array into blocks of data according to the first pattern can be done as desired, and each block of data can represent any suitable and desired region (area) of the overall array of data.

Each block of data according to the first pattern in an embodiment represents a different part (sub region) of the overall array (although the blocks could overlap if desired). Each block should represent an appropriate portion (area) of the array (plurality of data positions within the array).

In one embodiment, the or each array of data produced by the first processing stage is divided according to the first pattern into regularly sized and shaped regions (blocks of data), in an embodiment in the form of squares or rectangles. However, this is not essential and other arrangements could be used if desired. Suitable data block sizes for the first pattern would be, e.g., 8×8, 16×16 or 32×32 data positions in the data array.

In an embodiment, each data block produced by the first processing stage corresponds to a "tile" that the first processing stage produces as its output. Thus, the first pattern is in an embodiment a tile pattern.

(In tile-based data processing systems, the two dimensional output array (e.g. frame) of the data processing system is sub divided or partitioned into a plurality of smaller regions, usually referred to as "tiles", for the data processing. The tiles (sub regions) may each be processed separately (e.g. one after another or in parallel). The tiles (sub regions) may be recombined, if desired, to provide the complete output array (frame), e.g. for display.

Other terms that are commonly used for "tiling" and "tile based" processing include "chunking" (the sub regions are referred to as "chunks") and "bucket" data processing. The terms "tile" and "tiling" will be used herein for convenience, but it should be understood that these terms are intended to encompass all alternative and equivalent terms and techniques.)

Where the data is produced as data words, each block of data in an embodiment comprises plural data words (e.g. plural AXI words), with each word in an embodiment including data in respect of multiple data positions of the block.

In another embodiment, the first processing stage is operable to produce data in the form of plural lines. That is, the first pattern may be a line (raster) pattern. In this case, each line of data produced by the first processing stage should, and in an embodiment does, comprise a row of data positions of the data array that is one data position high and many data positions wide (long). Each line in an embodiment has a width corresponding to (equal to) the width of the overall array of data produced by the first processing stage. However, it would also be possible for each line to have some other width, such as a fraction (e.g. half) of the width of the overall array of data. Where, as discussed above, the data comprises plural data words, the first processing stage may produce the data words in raster (line) order, i.e. from word to word in raster line order.

The first processing stage may produce data in any suitable and desired manner. The first processing stage in an embodiment generates the data, e.g. by generating the data itself, and/or by reading or receiving data from elsewhere (such as from memory or one or more other processing stages of the data processing system), and then processing (e.g. modifying) that data.

In embodiments where data is read from memory, the memory may comprise any suitable memory and may be configured in any suitable and desired manner. For example, it may be a memory that is on chip with and/or local to the processing stage in question or it may be an external memory. In an embodiment it is an external memory, such as a main memory of the data processing system. It may be dedicated memory for this purpose or it may be part of a memory that is used for other data as well. In an embodiment the data is read from (and stored in) a frame buffer.

Correspondingly, in embodiments where data is read from memory, the data processing system and/or the first processing stage may comprise a read controller, such as a Direct Memory Access (DMA) read controller operable to read data from the memory.

In an embodiment, the first processing stage comprises a decoder, in an embodiment an ARM Frame Buffer Compression (AFBC) (or other block-based encoding scheme) decoder (AFBC is described in US A1 2013/0034309), which is operable to decode (decompress) data such as one or more received (in an embodiment AFBC) encoded (compressed) blocks of data, which are, e.g., read from memory. Accordingly, in this embodiment, the first processing stage that produces data according to a first pattern comprises a (AFBC) decoder that decodes and/or decompresses (blocks of) (AFBC) encoded data to produce decoded and/or decompressed (e.g. colour) data according to the first pattern (e.g. blocks of decoded and/or decompressed data).

In another embodiment, the first processing stage comprises a rotation stage which is operable to rotate data such as one or more received blocks of data, which are, e.g., read from memory. Accordingly, in this embodiment, the first processing stage that produces data according to a first pattern comprises a rotation stage that rotates (blocks of) (e.g. colour) data to produce rotated data according to the second pattern (e.g. blocks of rotated data).

The second processing stage uses the data produced by the first processing stage. To facilitate this, the first processing stage is in an embodiment operable to write its data (according to the first pattern) to storage, e.g. a memory, in an embodiment a (local) buffer memory, of the data processing system, for use by the second processing stage.

Thus, in an embodiment:

the data processing system further comprises a memory, in an embodiment a buffer memory; and the first processing stage writes the data according to the first pattern to the memory for use by the second processing stage.

The second processing stage of the technology described herein may comprise any suitable and desired processing stage that is operable to use the data produced by the first processing stage according to a second different pattern. The second processing stage may comprise, for example, a so-called "de-tiler" of a display controller that is operable to convert data in the form of one or more blocks of data (tiles) to data in the form of one or more lines of data, e.g. for further processing and/or display.

It would also be possible for the second processing stage to comprise a "tiler" of a display controller that is operable to convert data in the form of one or more lines of data to data in the form of one or more blocks of data (tiles), e.g. for further processing and/or display.

Again, there may be a single second processing stage or there may be plural second processing stages operable to use the data according to the second pattern. Where there are plural second processing stages, then each second processing stage is in an embodiment operated in the manner of the second processing stage of the technology described herein.

The data produced by the first processing stage is used by the second processing stage according to a second pattern. Thus, the second processing stage should (and in an embodiment does) use the data according to a pattern other than the first pattern. The second pattern may comprise any suitable and desired pattern according to which data may be used, so long as it is different to the first pattern.

In an embodiment, the data (array) is used by the second processing stage according to a pattern that the second processing stage and/or one or more other downstream processing stages of the data processing system is configured to use as its input. Thus, for example, in one embodiment where the data comprises image data for display (or data to be used to generate an image for display), the data (array) is used by the second processing stage according to a pattern that corresponds to the pattern that a (the) display is configured to use as its input (i.e. the pattern used by the second processing stage corresponds to the pattern of data that is provided to a display for display).

In an embodiment, the data is used by the second processing stage in the form of lines, in an embodiment in raster (line) order. That is, the second pattern is in an embodiment a line (raster) pattern.

Each line of data should, and in an embodiment does, comprise a row of data positions of the data array that are one data position high and many data positions wide (long). Each line in an embodiment has a width corresponding to (equal to) the width of the overall array of data produced by the first processing stage. However, it would also be possible for each line to have some other width, such as a fraction (e.g. half) of the width of the overall array of data.

Thus, where the or each overall array of data produced by the first processing stage comprises an array of plural data positions, the array of data is in an embodiment used by the second processing stage from data position to data position in raster line order. Correspondingly, where, as discussed above, the data comprises plural data words, the second processing stage in an embodiment uses the data words in raster (line) order, i.e. from word to word in raster line order.

In another embodiment, the data is used by the second processing stage in the form of plural blocks of data, where each block of data represents a particular region (area) of an array of data, e.g. as described above. In this case, each block of data should, and in an embodiment does, comprise at least two rows and at least two columns of data positions of the data array. Suitable data block sizes for the second pattern would be, e.g., 8×8, 16×16 or 32×32 data positions in the data array.

The second processing stage may use the data produced by the first processing stage in any suitable and desired manner. The rate at which data is used by the second processing stage should be (and is in an embodiment) different to, and in an embodiment slower than, the rate at which data is produced by the first processing stage.

In order for the second processing stage to use the data (produced according to the first pattern) according to the second pattern, the data produced by the first processing stage (according to the first pattern) must effectively be, and in an embodiment is, converted into data according to the second pattern.

This may be achieved in any suitable and desired manner. However, according to an embodiment, the second processing stage is operable to read the data from the storage, e.g. memory, in which the data is stored according to the second pattern. Thus, the second processing stage in an embodiment uses the data according to the second pattern by reading the data from memory according to the second pattern.

Accordingly, in an embodiment:

the first processing stage writes the data according to the first pattern to a memory for use by the second processing stage; and the second processing stage reads the data from the memory according to the second different pattern.

Where, as discussed above, the first pattern comprises a block (tile) pattern and the second pattern comprises a line (raster) pattern, the first processing stage in an embodiment writes blocks (tiles) of data to the memory, and the second processing stage in an embodiment reads lines of data from the memory, e.g. reads data in raster order.

Thus, in an embodiment, the first processing stage is configured to produce regions in the form of two-dimensional blocks (arrays) of data positions (i.e. "tiles") of an output array (i.e. regions whose height and width are each greater than a single data position) and to write those regions (blocks of data) to a memory of the data processing system, whereas the second processing stage is in an embodiment configured to use the data array (to read the data array from the memory) in raster order, i.e. in the form of lines (rows of data positions that are one data position high and many data positions wide (long)).

This will accordingly mean that the second processing stage is in an embodiment configured to use (read) some but not all of the data positions from multiple first processing stage output regions (blocks) consecutively (i.e. rather than using a complete block before starting the next block), e.g. and in an embodiment, line by line (row by row), where each line (row) comprises a concatenated respective row of data positions from plural different first processing stage output regions (blocks). Thus, each line (row) of data positions that is used by the second processing stage can be (and in an embodiment is) taken from plural blocks (tiles) of the overall data array that is produced by the first processing stage.

In one such embodiment, the data positions from each corresponding line (row) of each of plural output regions (blocks) are used (read) consecutively, i.e. one after another before moving onto the next line. For example, the data positions in the top line (rows) of each of the blocks in a line (row) of blocks can be used (read) consecutively. The data positions in the second lines of each of the blocks in the line (row) of blocks can then be used (read) consecutively (together), and so on.

On the other hand, where, as discussed above, the first pattern comprises a line (raster) pattern and the second pattern comprises a block (tile) pattern, the first processing stage in an embodiment writes lines of data to the memory, and the second processing stage in an embodiment reads blocks (tiles) of data from the memory.

Thus, in an embodiment, the first processing stage is configured to produce regions in the form of lines (rows of data positions that are one data position high and many data positions wide (long)), and to write those lines of data to a memory of the data processing system, whereas the second processing stage is in an embodiment configured to use the data array (to read the data array from the memory) in the form of two-dimensional blocks (arrays) of data positions (i.e. "tiles") (i.e. regions whose height and width are each greater than a single data position).

The second processing stage using the data may also comprise the second processing stage processing the data (itself) and/or the second processing stage passing the (optionally processed) data to one or more subsequent (downstream) processing stages of the data processing system, e.g. and in an embodiment for further processing.

In an embodiment the second processing stage comprises a "de-tiler" processing stage, e.g. of a display controller, operable to convert data received in the form of one or more blocks (tiles) to data in the form of lines, e.g. for further processing and/or display. In this embodiment, the memory of the data processing system (to which the first processing stage writes its data) is in an embodiment a part of the de-tiler. Thus, in this embodiment, the first processing stage in an embodiment writes its data (according to the first pattern) to a buffer memory of the de-tiler, and then the de-tiler in an embodiment reads the data out from the buffer according to the second pattern.

Where, as discussed above, the data comprises plural data words, the second processing stage (de-tiler) in an embodiment reads the data words in raster (line) order, i.e. from word to word in raster line order, and then processes each word and/or passes each word to one or more subsequent (downstream) processing stages of the data processing system, e.g. and in an embodiment for further processing.

On the other hand, where the second processing stage comprises a "tiler" processing stage, e.g. of a display controller, operable to convert data received in the form of lines to data in the form of blocks (tiles), e.g. for further processing and/or display, the memory of the data processing system (to which the first processing stage writes its data) may be a part of the tiler. Thus, in this embodiment, the first processing stage in an embodiment writes its data (according to the first pattern) to a buffer memory of the tiler, and then the tiler in an embodiment reads the data out from the buffer according to the second pattern.

In one embodiment, the second processing stage further comprises an (pixel) unpacking processing stage operable to extract data in respect of each of plural individual data positions (pixels) from each of plural data words (i.e. where each data word comprises data in respect of multiple data positions of the overall data array).

The data in respect of each data position (pixel) may then be processed further by the second processing stage and/or passed onwardly to one or more further (downstream) processing stages of the data processing system, e.g. for further processing. In one embodiment, the second processing stage may also comprise one or more layer or pixel processing pipelines operable to process the data in respect of each data position (pixel) as appropriate, e.g. for display.

Accordingly, in these embodiments, the first processing stage in an embodiment produces data in the form of plural data words (where each data word comprises data in respect of multiple data positions of the overall data array), and the data is then used (processed) by the second processing stage on a data position by data position (e.g. pixel by pixel) basis. This will accordingly further increase the time taken for the set of data to be used, and correspondingly the amount of time for which the first processing stage can be deactivated.

The second processing stage using the data may also or instead comprise the second processing stage causing at least some of the data and/or at least some of the processed data to be displayed. Thus, in one embodiment, the second processing stage may be operable to provide the (optionally processed) data (according to the second pattern) (directly) to a display for display.

To facilitate this, the second processing stage in an embodiment comprises an output stage operable to provide an image for display to a display. This output stage may be any suitable such output stage operable to provide an image for display to a display, e.g. to cause an image for display to be displayed on a display (to act as a display interface). The output stage in an embodiment comprises appropriate timing control functionality (e.g. it is configured to send pixel data to the display with appropriate horizontal and vertical blanking periods) for the display.

As discussed above, in the technology described herein, the first processing stage is deactivated when the first processing stage has produced a set of data, and the first processing stage is then re-activated based on the use of the set of data by the second processing stage.

Deactivating the first processing stage may be achieved in any suitable and desired manner, but in an embodiment, a portion or portions of the first processing stage circuitry is disabled, e.g. so as to reduce power consumption of the first processing stage circuitry. In an embodiment, deactivating the first processing stage comprises "clock gating" the first processing stage, i.e. turning off the first processing stage's clock.

Correspondingly, (re-)activating the first processing stage may be achieved in any suitable and desired manner, but in an embodiment, a portion or portions of the first processing stage circuitry (e.g. the portion or portion disabled when deactivating the first processing stage) is (re-)enabled. In an embodiment, activating the first processing stage comprises turning on the first processing stage's clock.

Where appropriate, any one or more of the processing stages of the data processing system may be activated and deactivated, e.g. together with the first processing stage, in an embodiment so as to further reduce the power consumption of the data processing system. Thus, for example, the read controller may be activated and deactivated together with the first processing stage, if desired.

In an embodiment, activating the first processing stage comprises activating the first processing stage so as to produce a further set of data. In this case, the further set of data in an embodiment corresponds to (is the same size as) the (initial) set of data.

Thus, in an embodiment, the method comprises:

deactivating the first processing stage when the first processing stage has produced a first set of data, the first set of data including sufficient data to allow the first set of data to be used according to the second pattern;

activating the first processing stage based on the use of the first set of data by the second processing stage to produce a second set of data, the second set of data in an embodiment including sufficient data to allow the second set of data to be used according to the second pattern.

The first processing stage is in an embodiment then deactivated again when it has finished producing the second set of data, and in an embodiment then re-activated based on the use of the second set of data by the second processing stage, and so on.

The or each set of data produced by the first processing stage may comprise any suitable and desired set of data that includes sufficient data to allow the set of data to be used according to the second pattern of the second processing stage. The or each set of data should be produced according to the first pattern.

As discussed above, since the (first) pattern in which the data is produced is different from the (second) pattern according to which the data is used (consumed), an arbitrary set of data produced according to the first pattern (by the first processing stage) would not typically be "independently" usable according to the second pattern (by the second processing stage), e.g. without requiring the production of further data while that set of data is being used (consumed).

For example, where, as discussed above, data is produced in the form of blocks (tiles) and then used (consumed) in the form of lines, an appropriate (e.g. a full) line width of blocks (tiles) must be produced before the set of data can be used "independently", i.e. before the data can be consumed in lines without requiring the production of further data while the set of data is being used (consumed). That is, a row (line) of blocks of data should be produced, where the row (line) of blocks of data has a length (width) equal to the length (width) of each of the lines in the second pattern.

Thus, the set of data produced by the first processing stage (before the first processing stage is deactivated) in an embodiment comprises a particular, in an embodiment selected, in an embodiment predetermined, set of data, which in an embodiment has a size (width and/or height), e.g. in terms of the number of data positions within the set of data, that allows it to be used according to the second pattern (by the second processing stage). Accordingly, the size of the set of data produced by the first processing stage (before the first processing stage is deactivated) will in an embodiment depend on both the first and second patterns, i.e. the relationship between the patterns.

The or each set of data may comprise just (only) enough data to allow the second processing stage to use the data, or may comprise more data than this.

Where, as discussed above, the data is produced by the first processing stage in the form of plural blocks of data, each set of data will in an embodiment comprise a plurality of blocks of data. Thus, in an embodiment, the data processing system is operable to deactivate the first processing stage when the first processing stage has produced a set of plural blocks of data. The first processing stage is in an embodiment deactivated when it has produced a particular, in an embodiment selected, in an embodiment predetermined, number of blocks of data (which number is in an embodiment based on the number of blocks needed to allow the second processing stage to use the set of plural blocks of data according to the second pattern).

Correspondingly, where, as discussed above, the data is used by the second processing stage in the form of plural (raster) lines of data, each set of data will in an embodiment comprise sufficient data to allow the set of data to be used (consumed) in (raster) lines.

In an embodiment, the or each set of data comprises a set of plural blocks of data, the set of plural blocks of data comprising sufficient blocks of data to allow the set of plural blocks of data to be used (consumed) in (raster) lines. In one such embodiment, the set of data comprises one or more rows (or "lines") of blocks of data, i.e. where the or each row of blocks of data spans the entire (width of the) (raster) line of the second pattern. As discussed above, in this case, each line of the second pattern in an embodiment corresponds to (has a width equal to) the entire width of the overall array of data (frame), but it would also be possible for each line of the second pattern to have some other width, such as some fraction (e.g. half) of the entire width of the overall array of data (frame).

Correspondingly, where, as discussed above, data is produced in the form of lines and then used (consumed) in the form of blocks (tiles), an appropriate set (an appropriate number) of lines of data is in an embodiment produced, e.g. comprising sufficient lines of data to allow the set of lines of data to be used (consumed) in blocks (tiles) (e.g. that corresponds to the "height" of a tile).

As discussed above, the first processing stage is (re-) activated based on the use of the set of data by the second processing stage.

In an embodiment, the first processing stage is (re-) activated while the set of data is being used by the second processing stage, i.e. before the second processing stage has used all of the (already produced) set of data.

In these embodiments, the first processing stage may be (re-)activated at any point before the second processing stage has used all of the set of data. However, in an embodiment, the first processing stage is (re-)activated at or close to the point at which the time taken for the first processing stage to produce a further set of data is equal to or sufficiently similar to the time taken for the second processing stage to use the remaining data of the (already produced) set of data. As discussed above, this helps to ensure that the second processing stage is not starved of data for its use, while maximising (or at least increasing) the amount of time for which the first processing stage is deactivated and the resulting power savings.

In one embodiment the first processing stage is (re-) activated at a point at which the time taken for the second processing stage to use the remaining data of the (already produced) set of data is less than or equal to the time taken for the first processing stage to produce a further set of data, in an embodiment plus some margin.

In an embodiment (where the set of data produced by the first processing stage comprises an array of data positions), a particular "activation" data position or positions of the first set of data is determined, and then the first processing stage is activated based on whether the second processing stage has used the particular data position or positions, e.g. when the second processing stage uses (and/or reaches) the particular data position or positions. Thus, in an embodiment, the first processing stage is (re-)activated based on whether the second processing stage has used and/or reached a particular, in an embodiment selected, in an embodiment predetermined, data position or positions in the array of data in question.

In this embodiment, the activation data position or positions may be determined as desired. However, in an embodiment, the particular data position or positions is or are determined by determining a data position or positions of the set of data for which the time (e.g. the number of clock cycles) taken for the second processing stage to use the data of the set of data subsequent to that data position or positions is less than or equal to the time (e.g. the number of clock cycles) taken for the first processing stage to produce a further set of data, in an embodiment plus a margin.

Where a margin is used in these embodiments, the margin may be set as desired (e.g. in terms of a number of clock cycles), e.g. to account for any (unpredictable or otherwise) delays, e.g. caused by latency in the data processing system. The margin is in an embodiment settable in use, e.g. by a driver for the data processing system, in an embodiment on a data array by data array (frame-by-frame) basis.

Other arrangements would, of course, be possible.

It is believed that the idea of controlling a data producing processing stage of a data processing system when a data consuming processing stage of the data processing system uses (consumes) a particular data position or positions of a set of data produced by the data producing processing stage is new and advantageous in its own right.

Thus, another embodiment of the technology described herein comprises a method of operating a data processing system, the method comprising:

a first processing stage producing a first set of data according to a first pattern, the first set of data comprising plural data positions; and a second processing stage using the first set of data according to a second different pattern;

wherein the method further comprises:

determining a particular data position or positions of the first set of data for controlling the production of data by the first processing stage; and controlling the production of data by the first processing stage based on whether the second processing stage has used the particular data position or positions.

A further embodiment of the technology described herein comprises a data processing system comprising:

a first processing stage operable to produce a first set of data according to a first pattern, the first set of data comprising plural data positions; and a second processing stage operable to use the first set of data according to a second different pattern;

wherein the data processing system is configured to:

determine a particular data position or positions of the first set of data for controlling the production of data by the first processing stage; and control the production of data by the first processing stage based on whether the second processing stage has used the particular data position or positions.

As will be appreciated by those skilled in the art, these embodiments of the technology described herein can, and in an embodiment do, include one or more or all of the optional features of the technology described herein, as appropriate.

Thus, for example, the particular data position or positions are in an embodiment determined by determining a data position or positions of the first set of data for which the time (e.g. the number of clock cycles) taken for the second processing stage to use the data of the first set of data subsequent to that data position or positions is less than or equal to the time (e.g. the number of clock cycles) taken for the first processing stage to produce a second set of data, optionally plus a margin.

Similarly, the first processing stage is in an embodiment deactivated when it has produced the first set of data, e.g. and in an embodiment as described above. The production of data by the first processing stage is in an embodiment then controlled based on whether the second processing stage has used the particular data position or positions, e.g. by activating the first processing stage in an embodiment so as to produce a second set of data, when the second processing stage uses the particular data position or positions, e.g. and in an embodiment as described above.

It will be appreciated from the above that in an embodiment, the production of data by the first processing stage is controlled based on the relative (first) pattern of production of data and the (second) pattern of use (consumption) of that data, i.e. based on the relationship between the patterns.

The data processing system of the technology described herein may comprise any suitable and desired data processing system. However, as will be appreciated by those having skill in the art, the technology described herein is particularly relevant to and useful in display controllers or data processing systems comprising display controllers.

Thus, in an embodiment, the data processing system of the technology described herein is or includes a display controller.

Correspondingly, another embodiment of the technology described herein comprises a method of operating a display controller for data processing system, the method comprising:
a first processing stage of the display controller producing data according to a first pattern; and
a second processing stage of the display controller using the data produced by the first processing stage according to a second different pattern;
the method further comprising the display controller:
deactivating the first processing stage when the first processing stage has produced a set of data, the set of data including sufficient data to allow the set of data to be used according to the second pattern; and
activating the first processing stage based on the use of the set of data by the second processing stage.

Another embodiment of the technology described herein comprises a display controller for a data processing system, the display controller comprising:
a first processing stage operable to produce data according to a first pattern; and
a second processing stage operable to use the data produced by the first processing stage according to a second different pattern;
wherein the display controller is operable to:
deactivate the first processing stage when the first processing stage has produced a set of data, the set of data including sufficient data to allow the set of data to be used according to the second pattern; and
activate the first processing stage based on the use of that set of data by the second processing stage.

As will be appreciated by those skilled in the art, these embodiments of the technology described herein can, and in an embodiment do, include one or more or all of the optional features of the technology described herein, as appropriate.

The display controller may be any suitable and desired display controller and may comprises any suitable and desired additional processing stages that a display controller may include. The display controller should be and is in an embodiment operable to provide an image for display to a display.

The (first processing stage of the) display controller in an embodiment comprises a decoder and/or a rotation stage, in an embodiment together with a read controller, e.g. and in an embodiment as described above. The (second processing stage of the) display controller in an embodiment comprises a de-tiler processing stage, e.g. as discussed above, operable to convert data received in the form of one or more blocks (tiles) to data in the form of lines, e.g. for further processing and/or display, an (pixel) unpacking processing stage operable to extract data in respect of each of plural individual data positions (pixels) from each of plural data words, one or more layer or pixel processing pipelines operable to process the data in respect of each data position (pixel) as appropriate, e.g. for display, and/or an output stage operable to provide an image for display to a display, e.g. and in an embodiment as described above.

Although the technology described herein is described above with particular reference to the processing of a given data array (e.g. a frame for display), as will be appreciated by those skilled in the art, the technology described herein can be, and is in an embodiment, used for processing plural data arrays (e.g. providing plural frames for display), and in an embodiment for processing a sequence of data arrays (e.g. providing a sequence of frames to be displayed to a display).

The various stages of the data processing system may be implemented as desired, e.g. in the form of one or more fixed-function units (hardware) (i.e. that is dedicated to one or more functions that cannot be changed), or as one or more programmable processing stages, e.g. by means of programmable circuitry that can be programmed to perform the desired operation. There may be both fixed function and programmable stages.

One or more of the various processing stages of the technology described herein may be provided as a separate circuit element(s) to other stages of the data processing system. However, one or more stages may also be at least partially formed of shared data processing circuitry.

One or more of the various stages of the technology described herein may be operable to always carry out its function on any and all received data. Additionally or alternatively, one of more of the stages may be operable to selectively carry out its function on the received data, i.e. when desired and/or appropriate.

The data processing system may and in an embodiment does also comprise one or more of, and in an embodiment all of: a central processing unit, a graphics processing unit, a video processor (codec), a system bus, a memory controller, an image signal processor, a display processing unit, and additional elements as known to those skilled in the art.

The data processing system may be, and in an embodiment is, configured to communicate with one or more of (and the technology described herein also extends to an arrangement comprising one or more of): an external memory (e.g. via the memory controller), one or more local displays, and/or one or more external displays.

In an embodiment, the data processing system further comprises a or the display. The display that the display controller is used with may be any suitable and desired display, such as for example, a screen (such as a panel) or a printer.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may comprise a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the display processing pipeline can otherwise include any one or more or all of the usual functional units, etc., that display processing pipelines include.

The data processing system in an embodiment also comprises, and/or is in communication with, one or more memories and/or memory devices that store the data described herein, and/or that store software for performing the processes described herein. The data processing system may also be in communication with the host microprocessor, and/or with a display for displaying images based on the data generated by the data processing system.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

FIG. 1 shows schematically a data processing system in accordance with an embodiment of the present embodiment. The data processing system comprises a video codec 1, central processing unit (CPU) 2, graphics processing unit (GPU) 3, display controller 4 and a memory controller 7. As shown in FIG. 1, these communicate via an interconnect 6 and have access to off-chip main memory 8. The video codec 1, CPU 2, and/or the GPU 3 generate output surfaces and store them, via the memory controller 7, in a frame buffer in the off-chip memory 8. The display controller 4 then reads output surfaces from the frame buffer in the off-chip memory 8 via the memory controller 7 and sends them to a display 5 for display.

Figure 2:
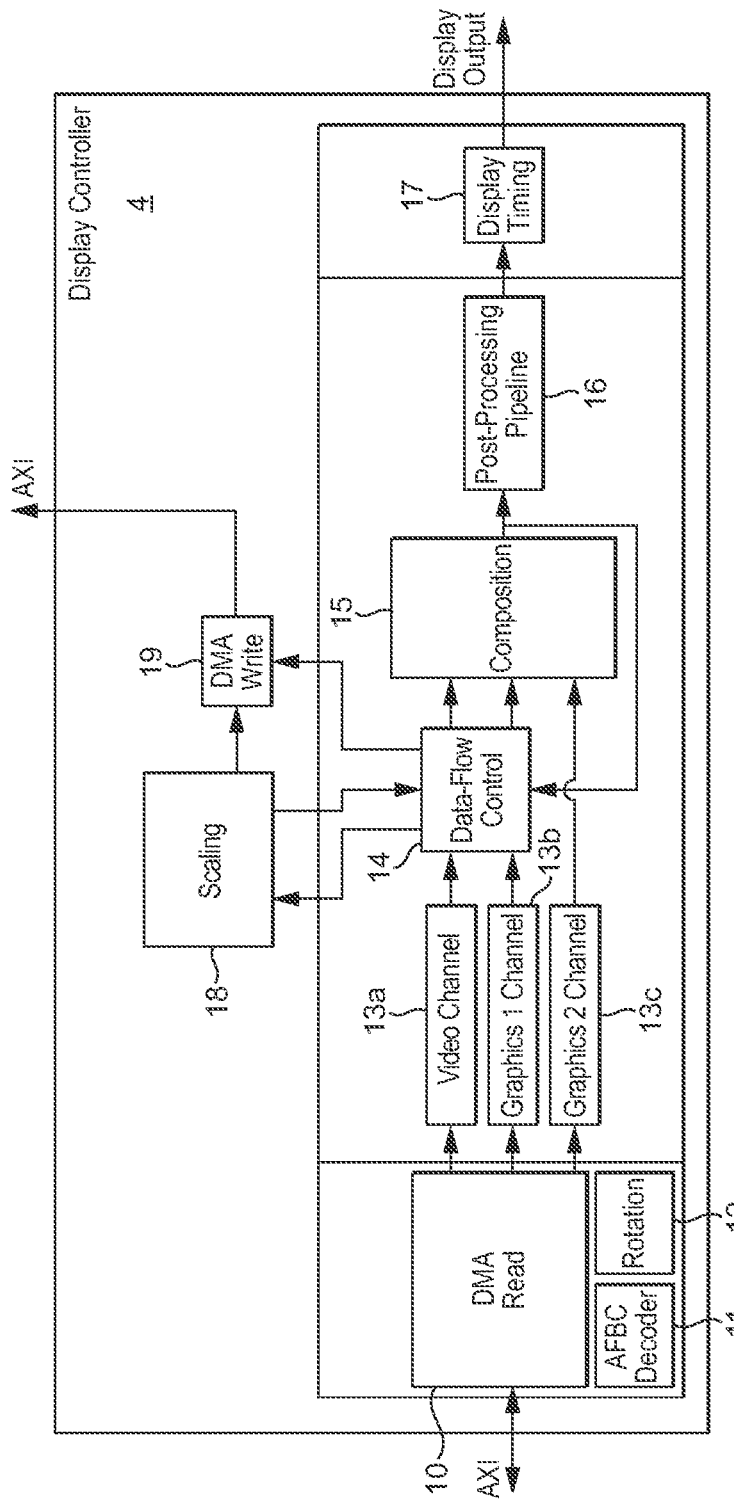
FIG. 2 shows schematically a display controller in accordance with an embodiment of the technology described herein.

FIG. 2 shows schematically a display controller 4 in accordance with an embodiment of the technology described herein. In FIG. 2, the rectangles represent functional units of the display controller, while the arrowed lines represent connections between the various functional units.

FIG. 2 shows the main elements of the display controller 4 that are relevant to the operation of the present embodiment. As will be appreciated by those skilled in the art there will be other elements of the display controller 4 that are not illustrated in FIG. 2. It should also be noted here that FIG. 2 is only schematic, and that, for example, in practice the shown functional units and stages may share significant hardware circuits, even though they are shown schematically as separate stages in FIG. 2. It will also be appreciated that each of the stages, elements and units, etc., of the display controller 4 as shown in FIG. 2 may be implemented as desired and will accordingly comprise, e.g., appropriate circuitry and/or processing logic, etc., for performing the necessary operation and functions.

In the present embodiment, the display controller 4 comprises a read controller in the form of a Direct Memory Access (DMA) read controller 10. The read controller 10 is configured to read one or more surfaces from main memory 8 (not shown in FIG. 2) via an interface such as an Advance eXtensible Interface (AXI). The one or more surfaces will typically be in the form of (optionally compressed) RGB data.

Co-located with the read controller 10 is a decoder 11 which can be used to (selectively) decode (decompress) received compressed surfaces as necessary, before onward transmission of the one or more decoded (decompressed) surfaces. The decoder 11 may comprise an ARM Frame Buffer Compression (AFBC) decoder (AFBC is described in US A1 2013/0034309). It would, of course, be possible to use other compression schemes. The use of compression reduces the bandwidth associated with the display controller 4 reading surfaces from the off-chip memory 8.

Similarly, rotation unit 12 can be used to selectively rotate one or more of the input surfaces as necessary before onward transmission of the one or more input surfaces.

In the illustrated embodiment, the read controller 10 is configured to (read) up to three different input surfaces (layers) which are to be used to generate a composited output frame. In this embodiment, the three input layers comprise one video layer, e.g. generated by a video processor (codec), and two graphics layers, e.g. two graphics windows generated by a graphics processing unit (GPU). Hence, FIG. 2 shows the displayer controller onwardly transmitting three input surfaces (display layers) via three layer pipelines or channels, namely video channel 13a, a first graphics channel 13b, and a second graphics channel 13c. Any or all of the transmitted input surfaces may have been subjected to decoding (decompression) by decoder 11 and/or rotation by rotation unit 12, as discussed above.

Although the embodiment of FIG. 2 illustrates the use of three input surfaces, it will be appreciated that any number of input surfaces (layers) may be used in the technology described herein, depending on the application in question (and also depending on any silicon area constraints, etc.). Equally, any number of layer pipelines or channels may be provided and used, as desired.

The display controller 4 of the present embodiment optionally comprises a multiplexer/data-flow control 14. Where present, the display controller may be configured such that multiplexer 14 receives inputs from any one or more (or all) of the input surface channels. The multiplexer 14 may operate to selectively transmit any one or more (or all) of the received inputs (i.e. surfaces) to any one or more of the multiplexer's 14 outputs.

The display controller 4 of the present embodiment optionally comprises a composition unit 15. Where present, the display controller 4 may be configured such that the composition unit 15 receives inputs directly from any one or more or all of the channels 13, and/or from the multiplexer 14. The composition unit 15 may operate to compose the received input surfaces to generate a composited output frame, i.e. by appropriate blending operations, etc. In the illustrated embodiment, the composited output frame may be onwardly transmitted by the composition unit 15 to multiplexer 14, and/or to post-processing pipeline 16.

The post-processing pipeline 16 is configured to selectively carry out any desired processing operation(s) on the (composited) output surface (frame). The post-processing pipeline 16 may, for example, comprise a colour conversion stage operable to apply a colour conversion to the (composited) output frame, a dithering stage operable to apply dithering to the (composited) output frame, and/or a gamma correction stage operable to carry out gamma correction on the (composited) output frame.

In the present embodiment, the post-processing pipeline 16 is configured to transmit the (processed) composited output frame to an output stage comprising a display timing unit 17 for appropriate display on a (local) display (not shown). The display timing unit 17 is configured to send pixel data to the display with appropriate horizontal and vertical blanking periods.

The display controller 4 of the present embodiment optionally comprises a scaling engine 18. Where present, the scaling engine 18 operates to (selectively) scale (i.e. upscale or downscale) any one or more received surfaces (frames) to generate a scaled surface (frame).

In the present embodiment, the display controller optionally comprises a write controller 19, e.g. in the form of a DMA write controller. Where present, the write controller 19 may be configured to write out received surfaces (frames) to external memory 8 (e.g. frame buffer), e.g. via AXI.

Thus, this embodiment of the technology described herein comprises a display controller that integrates a decoder 11, and a rotation unit 12, optionally together with a composition unit 15, and/or a scaling engine 18 capable of up and down-scaling surfaces. The decoder 11 and the rotation unit 12 are embedded within the display controller, such that surfaces read by the display controller 4 may be decoded (decompressed) and/or rotated (and then optionally further processed, e.g. composited and/or scaled) before being displayed, with only a single read (of each input surface) from the frame buffer being required.

Figure 3:
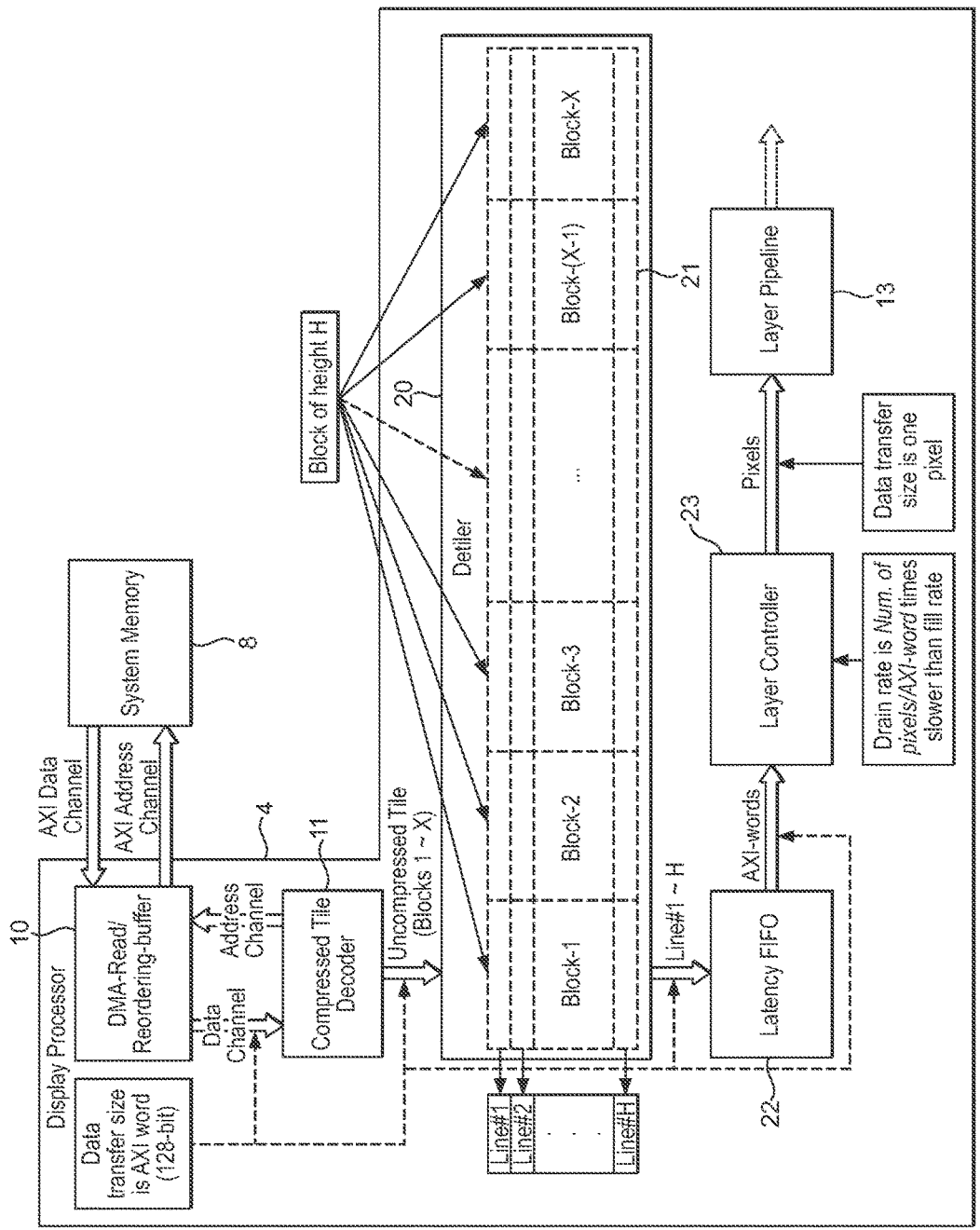
FIG. 3 shows schematically a portion of a display controller in accordance with an embodiment of the technology described herein.

FIG. 3 shows in more detail a portion of the display controller 4 that is particularly relevant to the operation of an embodiment. In this embodiment, one or more surfaces stored in the frame buffer in the off-chip memory 8 are compressed using AFBC or another block-based encoding scheme.

In AFBC and other block-based encoding schemes, each compressed surface is encoded as plural blocks (tiles) of data, where each block (tile) of data represents a particular region of the surface. Accordingly, the display controller 4 fetches each surface from the frame buffer in the off-chip memory 8 in blocks (tiles), i.e. block by block (tile by tile). In contrast, the display controller 4 provides output images for display to the display 5 in raster lines, i.e. rows of pixel positions that are one pixel position high and many pixels positions wide (long). Accordingly, the display controller 4 converts read block (tile) data into raster line data, and then sends the raster line data to the display 5 for display.

In the present embodiment, the read controller 10 is configured to read one or more blocks (tiles) of the compressed surface from main memory 8 via an interface such as an Advance eXtensible Interface (AXI). To do this, the read controller 10 sends requests to the memory 8 via an (AXI) address channel, and receives data from the memory 8 via a (AXI) data channel. The read controller 10 may comprise a re-ordering buffer to allow blocks (tiles) that are received by the read controller 10 out of order to be re-ordered, if desired.

The one or more compressed blocks (tiles) will be in the form of AFBC encoded RGB data. Each block (tile) will typically have a size of 16×8×4B=0.5 KB.

Compressed blocks (tiles) read by the read controller 10 are then onwardly transmitted to the decoder 11 via an (AXI) interface. The decoder 11 operates to decode the compressed blocks (tiles) to produce uncompressed tiles, e.g. of RGB data. The uncompressed blocks are then onwardly transmitted to a de-tiler 20 in the form of data words such as AXI words. Each word will include data in respect of multiple pixels (data positions) of the block (tile).

The de-tiler 20 operates to convert the block (tile) data to raster line data. As shown in FIG. 3, in order to do this, the de-tiler 20 comprises a buffer memory 21. Block (tile) data received by the de-tiler 20 is written to the buffer 21 block by block (tile by tile), and then raster line data in the form of data words such as AXI width words is read out from the buffer 21 by reading the appropriate words for each raster line from the buffer 21.

The line data in the form of (AXI) words is then fed to a pixel unpacker or layer controller 23 via a latency-hiding first in first out (FIFO) buffer 22. The pixel unpacker 23 extracts data for individual pixels (data positions) from the received (AXI) words, and onwardly transmits the data at a rate of one pixel per clock cycle to the appropriate channel or layer pipeline 13 for further processing (e.g. as discussed above).

Figure 4:
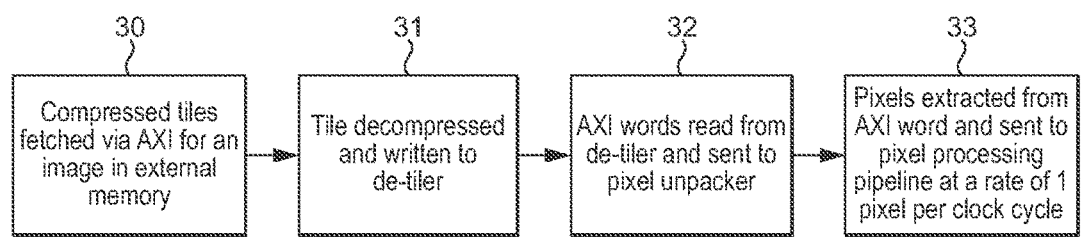
FIG. 4 shows schematically the operation of a display controller in accordance with an embodiment of the technology described herein.

FIG. 4 illustrates schematically the operation of the display controller 4 when fetching compressed block (tile) data and converting it into line data. As shown in FIG. 4, compressed blocks (e.g. of an AFBC compressed layer) are fetched from external memory 8 via an (AXI) interface (step 30). The blocks are decompressed and written to de-tiler 20 (step 31). Data words (AXI words) are then read from the de-tiler 20 and sent to the pixel unpacker 23 (step 32). Data is in respect of individual pixels is extracted from the (AXI) words and sent to layer or pixel processing pipeline 13 at a rate of 1 pixel per clock cycle (step 33).

In the arrangement of the present embodiment, each (AXI) word received by the pixel unpacker or layer controller 23 comprises data in respect of multiple pixels (data positions), and the individual pixel data is transmitted to the layer pipeline 13 at a rate of one pixel per clock cycle. Accordingly, the drain rate of the de-tiler 20 is relatively slow compared to rate at which it can be filled. In addition, as shown in FIG. 3, a sequence of x blocks (tiles) corresponding to an entire line (frame) width of blocks (tiles) should be written to the de-tiler buffer 21 before the block data can be read out in lines.

In the present embodiment, these facts are exploited to reduce the power consumption of the display controller 4. In particular, the decoder 11 is deactivated (clock gated) when it has produced an entire line of blocks of data, and while that data is being read out by the de-tiler 20, the decoder 11 is re-activated at or close to the point at which the time taken for the decoder 11 to produce another line of blocks (tiles) is equal to or sufficiently similar to the time taken for the de-tiler 20 to read out the remaining data of the already produced line of blocks. Thus, the decoder 11 is arranged to generate groups of requests for blocks (tiles) of data, e.g. periodically, when the data in the de-tiler buffer 21 that has not yet been read out from the buffer 21 is lower than a threshold.

This ensures that the de-tiler 20 and downstream stages are not starved of data for their use, while maximising (or at least increasing) the amount of time for which the decoder 11 can be clock gated and, correspondingly, the resulting power savings. The Applicants have found, for example, that in typical use cases, the decoder 11 may be clock gated for around 60% of the time, reducing power consumption of the decoder by over 50%. This reduction in power is significant since the decoder 11 typically consumes around 20% of the power used by display controller 4 in typical use cases.

In the present embodiment, the threshold for de-activating the decoder 11 (i.e. by turning off its clock), $\text{Threshold}_{TurnOffClock}$, is set at the point at which a whole line of blocks (tiles) is written to the de-tiler buffer 21:

$$\text{Threshold}_{TurnOffClock} = \text{Whole line of tiles written to de-tiler}$$

Correspondingly, a threshold for re-activating the decoder 11 is set such that the decoder 11 is re-activated at or close to the point at which the time taken for the decoder 11 to completely fill the de-tiler buffer 21 with another line of blocks (tiles) is equal to or sufficiently similar to the time taken for the remaining data within the de-tiler buffer 21 to be read out.

The threshold for activating the decoder 11 (i.e. by turning on its clock), $\text{Threshold}_{TurnOnClock}$, can be determined by comparing the filling and drain rates of the de-tiler buffer 21 as follows:

$$\text{Threshold}_{TurnOnClock} = \text{Cycles}_{DrainDe\text{-}tilerNM} < (\text{Cycles}_{FillDe\text{-}tiler} + \text{Margin}),$$

where, $\text{Cycles}_{DrainDe\text{-}tilerNM}$ is the number of clock cycles taken to drain the de-tiler buffer 21 given that the current output pixel position is (N, M) and is calculated as follows:

$$\text{Cycles}_{DrainDe\text{-}tilerNM} = [(\text{Tile height} * \text{AXI words in line}) - [((N-1)*\text{AXI words in line}) + M/\text{Pixels in AXI word}]] * \text{Pixels in AXI word},$$

$\text{Cycles}_{FillDe\text{-}tiler}$ is the number of cycles taken to completely fill the de-tiler buffer 21, and can be calculated as follows:

$$\text{Cycles}_{FillDe\text{-}tiler} = \text{Number of tiles} * \text{Cycles to decode one tile},$$

and Margin is a settable (e.g. software programmable) number of cycles to allow for (to offset) any (potential) delay caused by system latency.

Figure 5:
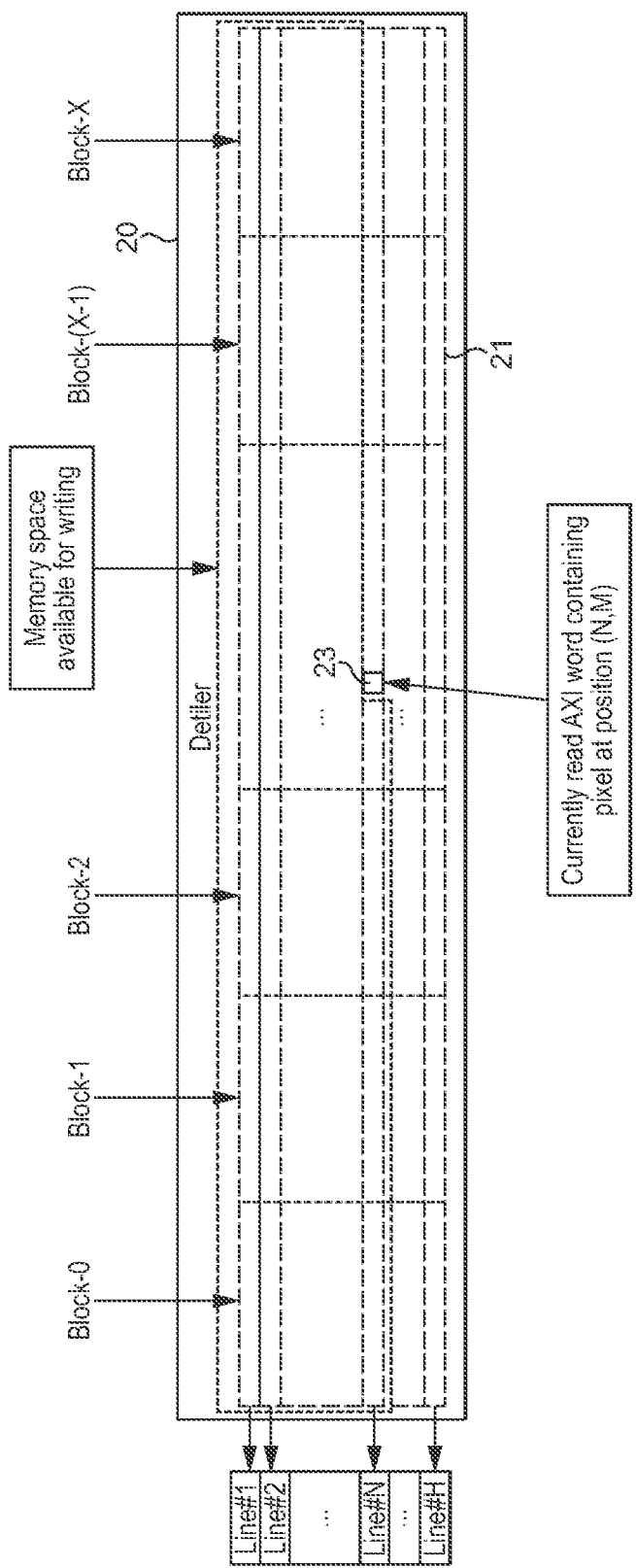
FIG. 5 shows schematically a de-tiler of a display controller in accordance with an embodiment of the technology described herein.

FIG. 5 illustrates this process. A particular "activation" data position (pixel) 23 is determined for (re-)activating the decoder 11. After filling up the entire de-tiler buffer 21 with a line of blocks (tiles) of data, the decoder block 11 is turned off until the data remaining in the de-tiler buffer 21, i.e. that has not yet been read out from the de-tiler buffer 21, is lower than a threshold, i.e. until the data word containing the particular data position 23 is read out by the de-tiler 20. At that point, the decoder 11 is enabled (activated) again, so as to fill up the de-tiler buffer 21 again. Once the de-tiler buffer 21 contains the next set of lines (as blocks) written to it, the decoder 11 is turned off again. This process is continued until the whole image (frame) has been de-tiled.

Figure 6:
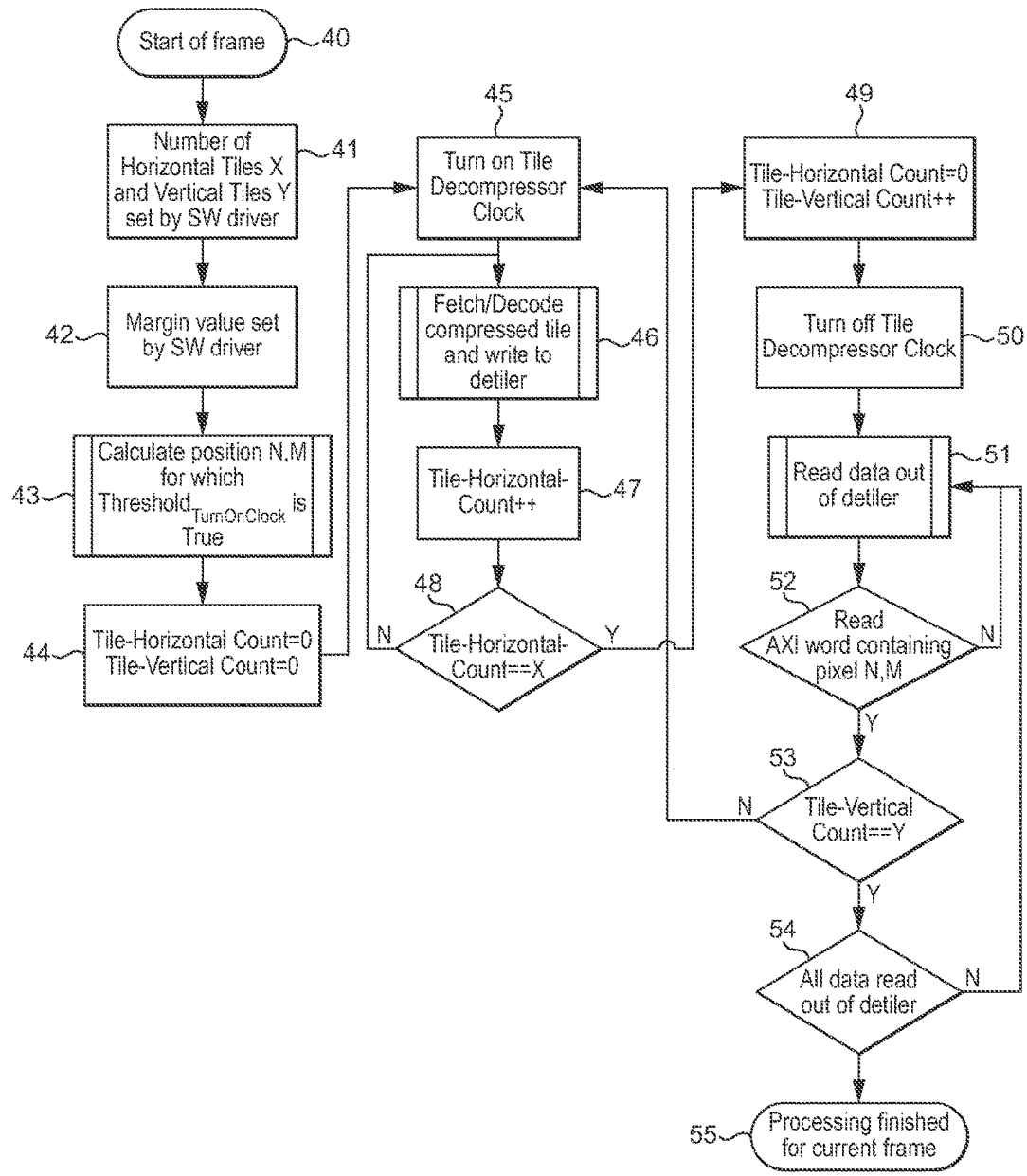
FIG. 6 shows schematically the operation of a display controller in accordance with an embodiment of the technology described herein.

FIG. 6 shows schematically the operation of the present embodiment. The process begins when a new frame is to be displayed (step 40). The number of blocks (tiles) into which the frame is to be divided for processing is set by the driver, e.g. in terms of the total number of blocks X in the horizontal direction, and the total number of blocks Y in the vertical direction (step 41). The margin for offsetting system latency is also set by the driver (step 42). The data position (pixel) N, M for which the activation threshold, $\text{Threshold}_{TurnOnClock}$, is satisfied in then determined (step 43), and horizontal block (tile) count and vertical block (tile) count counters are initiated to zero (step 44).

Next, the decoder's clock is turned on, i.e. so as to activate the decoder 11 (step 45). The decoder (together with the read controller 10) operate to fetch and decode (decompress) compressed blocks and to write the decoded (decompressed) blocks to the de-tiler buffer 21 (step 46).

This process is performed from block to block (tile to tile) in raster order. Thus, for each block (tile), the horizontal block counter is incremented (step 47), and a determination is made as to whether the end of the row of blocks has been reached. This is done by comparing the horizontal block count to the total number of blocks (tiles) in the horizontal direction X (step 48). When it is determined that the end of the row of blocks has not yet been reached, the process loops back so as to process the next block in the row of blocks (step 46). When it is determined that the end of the row of blocks has been reached, the horizontal tile counter is re-initialised to zero, and the vertical tile counter is incremented (step 49).

At this point, rather than the decoder 11 immediately processing the next block (tile) in the frame (i.e. the first block in the next row of blocks), the decoder's clock is turned off, i.e. so as to deactivate the decoder 11 (step 50). The de-tiler 20 then operates to read out the data in the de-tiler buffer 21 (step 51), i.e. from word to word in raster line order.

For each word, it is determined whether or not that word contains the particular activation pixel 23 at data position N, M (step 52). When it is determined that the word does not contain the particular activation pixel 23, the process loops back to step 51, i.e. so as to read out the next word. When, on the other hand, it is determined that the word does contain the particular activation pixel 23, it is then determined whether the last row of blocks of the frame has been processed. This is done by comparing the vertical tile count to the total number of tiles in the vertical direction Y (step 53).

When it is determined that the last row of blocks has not yet been processed, the process loops back so as to turn on the decoder's clock (step 45), to process the next row of blocks, and so on. On the other hand, when it is determined that the last row of blocks has been processed, it is then determined whether or not all of the data present within the de-tiler buffer 21 has been read out (step 54).

When this is not the case, the process loops back to step 51 to continue reading out data. When it is determined that all of the data present within the de-tiler buffer 21 has been read out, the process is ended for the current frame (step 55). The next frame may then be processed in a corresponding manner, and so on.

Although the above embodiment has been described in terms of processing (AFBC) compressed blocks (tiles), in general the technology described herein is applicable to arrangements which use raster scan based data processing, but that have one or more block-based inputs. Thus, the technology described herein may be used in, for example, de-tilers, display processors (display engines), stand-alone compressed tile (e.g. AFBC) decoders, video processors (video engines), etc.

The technology described herein is also applicable to arrangements in which data is produced in the form of lines and used in the form of blocks, such as where a processing stage produces lines of data, writes the lines of data into a buffer (e.g. of a "tiler"), and where blocks (tiles) of data are read out from the buffer, e.g. for encoding and writing to memory.

Figure 7:
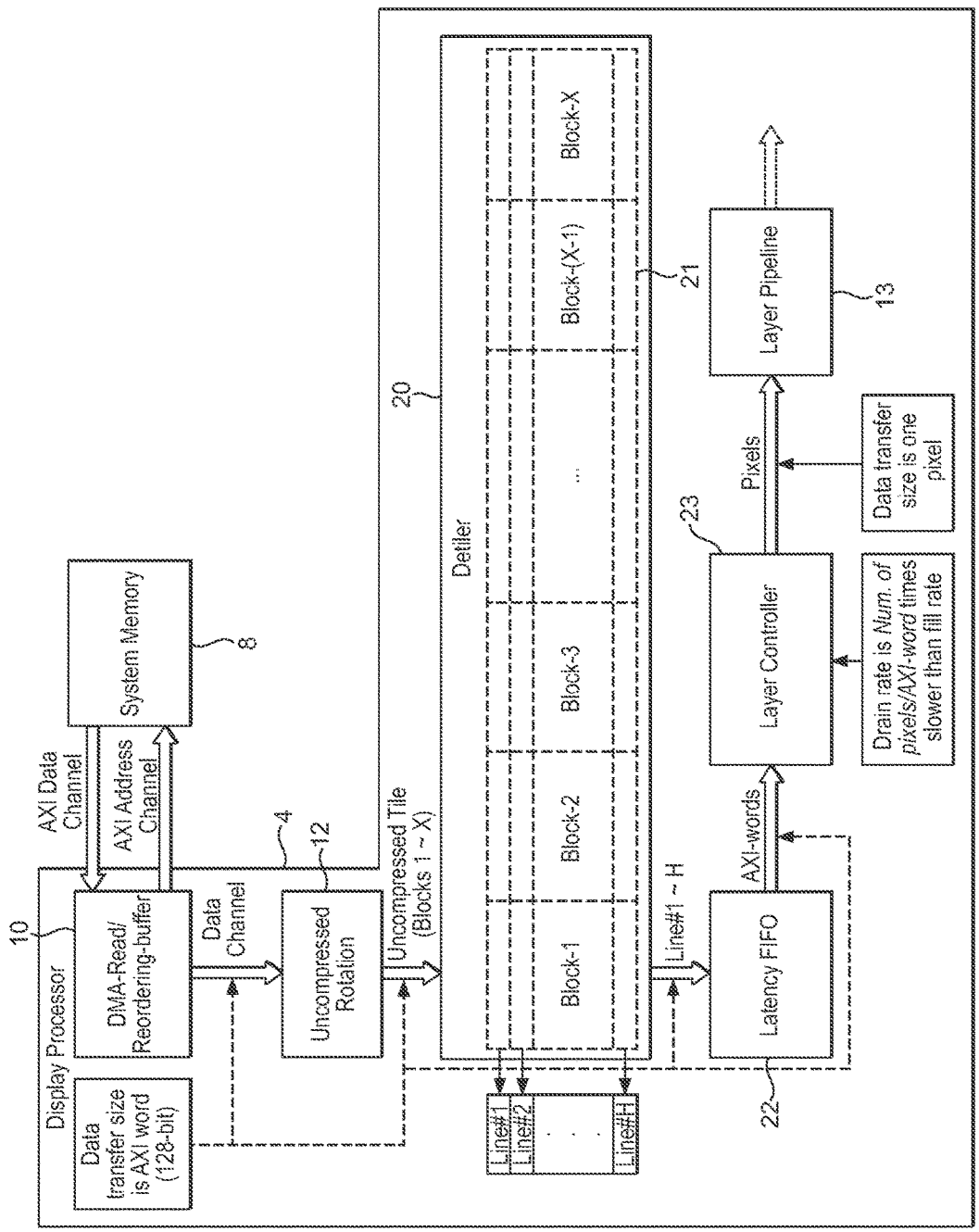
FIG. 7 shows schematically a portion of a display controller in accordance with another embodiment of the technology described herein.

FIG. 7 shows schematically a display controller 4 in accordance with another embodiment. FIG. 7 is similar to FIG. 3, and operates in a substantially similar manner. However, in place of the decoder 11 of FIG. 3 is a rotation stage 12, which e.g. operates to rotate received blocks of data.

Figure 8:
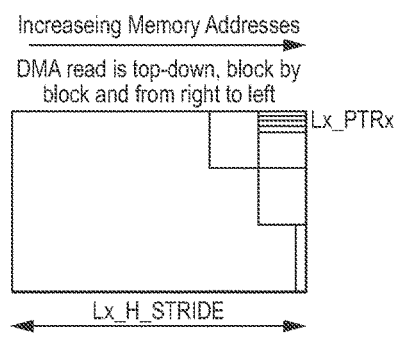
FIG. 8 shows schematically the division of an array of data into blocks according to an embodiment of the technology described herein.

Thus, in the embodiment of FIG. 7, the read controller 10 operates to read one or more (uncompressed) surfaces from memory 8, and to pass that data to the rotation stage 12. As shown in FIG. 8, in the present embodiment, this is done by reading blocks or columns of data into which a frame of data is divided.

As shown in FIG. 7, these columns are fed to the rotation block 12, which rotates the data as appropriate, and writes the data to the de-tiler buffer 21 in (AXI) words. The de-tiler 20 reads the data out from the buffer 21 in raster scan order as (AXI) words, and feeds it to the layer controller 23.

Figure 9:
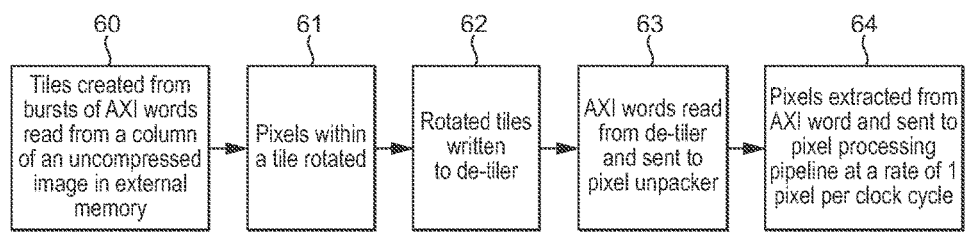
FIG. 9 shows schematically the operation of a display controller in accordance with an embodiment of the technology described herein.

FIG. 9 shows schematically the operation of the display controller 4 when fetching uncompressed data, rotating the data and converting it into raster line data in accordance with the present embodiment.

As shown in FIG. 9, blocks (tiles) created from bursts of (AXI) words are read from a column of an uncompressed surface in external memory 8 (step 60). The pixel data within the block (tile) is rotated as desired by the rotation stage 12 (step 61). Rotated blocks are then written to the de-tiler buffer 21 (step 62). Data words (AXI words) are read from the de-tiler buffer 21 and sent to the pixel unpacker 23 (step 63). Pixels are extracted from the (AXI) words and sent to the pixel processing pipeline 16 at a rate of one pixel per clock cycle (step 64).

In the present embodiment, the rotation stage 12 is deactivated (clock gated) when it has produced an entire line of blocks (tiles) of data, and while that data is being read out by the de-tiler 20, the rotation stage 12 is re-activated at or close to the point at which the time taken for the rotation stage 12 to produce another line of blocks (tiles) of data is equal to or sufficiently similar to the time taken for the de-tiler 20 to read out the remaining data of the already produced line of blocks (tiles) of data, e.g. in a corresponding manner to that described above. This ensures that the de-tiler 20 and downstream stages are not starved of data for their use, while maximising (or at least increasing) the amount of time for which the rotation stage 12 can be clock gated and, correspondingly, the resulting power savings.

It can be seen from the above that embodiments of the technology described herein enable reduction of power consumption within a data processing system, e.g. where block (tile) data is converted to line data. This is achieved, in embodiments at least, by deactivating a data producing (first) processing stage when that processing stage has produced a particular set of data, and then re-activating the data producing processing stage based on the use of the set of data by a data consuming (second) processing stage.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system, the method comprising:
   a first processing stage of the data processing system producing data according to a first pattern; and
   a second processing stage of the data processing system using the data produced by the first processing stage according to a second different pattern;
   the method further comprising the data processing system:
   producing by the first processing stage a set of data including sufficient data to allow the set of data to be used by the second processing stage according to the second pattern;
   deactivating the first processing stage following production of said set of data; and re-activating the first processing stage based on the use of the set of data by the second processing stage.

2. The method of claim 1, wherein the first processing stage producing data according to the first pattern comprises the first processing stage producing data in the form of plural blocks of data, where each block of data represents a particular region of an array of data.

3. The method of claim 1, wherein the second processing stage using the data according to the second pattern comprises the second processing stage using the data in the form of lines.

4. The method of claim 1, wherein the first processing stage producing data according to the first pattern comprises the first processing stage producing data in the form of lines.

5. The method of claim 1, wherein the second processing stage using the data according to the second pattern comprises the second processing stage using the data in the form of plural blocks of data, where each block of data represents a particular region of an array of data.

6. The method of claim 1, wherein the first processing stage comprises a decoder configured to decode and/or decompress data so as to produce decoded and/or decompressed data according to the first pattern.

7. The method of claim 1, wherein the first processing stage comprises a rotation stage configured to rotate data so as to produce rotated data according to the first pattern.

8. The method of claim 1, further comprising the first processing stage writing the data according to the first pattern to a memory of the data processing system for use by the second processing stage.

9. The method of claim 1, wherein the second processing stage using the data according to the second pattern comprises the second processing stage reading the data according to the second pattern from a memory of the data processing system in which the data is stored.

10. The method of claim 1, wherein the second processing stage using the data comprises the second processing stage causing at least some of the data and/or a processed version of at least some of the data to be displayed.

11. The method of claim 1, comprising re-activating the first processing stage before the second processing stage has used all of the set of data.

12. The method of claim 1, comprising re-activating the first processing stage when the time taken for the first processing stage to produce a further set of data is equal to or sufficiently similar to the time taken for the second processing stage to use remaining data of the set of data.

13. The method of claim 12, comprising re-activating the first processing stage when the time taken for the second processing stage to use remaining data of the set of data is less than or equal to the time taken for the first processing stage to produce a further set of data plus a margin.

14. The method of claim 1, comprising:
determining a particular data position or positions of the set of data for re-activating the first processing stage; and
re-activating the first processing stage when the second processing stage reaches the particular data position or positions of the set of data.

15. A method of operating a data processing system, the method comprising:
a first processing stage producing a set of data according to a first pattern, the set of data comprising plural data positions; and
a second processing stage using the set of data according to a second different pattern;
wherein the method further comprises:
determining a particular data position or positions of the set of data for activating the first processing stage to produce data, the set of data, including sufficient data to allow the set of data to be used by the second processing stage according to the second pattern; and
controlling the production of data by the first processing stage when the second processing stage reaches the particular data position or positions by activating the first processing stage when the second processing stage reaches the particular data position or positions of the set of data.

16. A data processing system comprising:
first processing stage circuitry configured to produce data according to a first pattern; and
second processing stage circuitry configured to use the data produced by the first processing stage according to a second different pattern;
wherein the data processing system is configured to:
produce by the first processing stage a set of data including sufficient data to allow the set of data to be used by the second processing stage according to the second pattern;
deactivate the first processing stage circuitry following production of said set of data; and
re-activate the first processing stage circuitry based on the use of that set of data by the second processing stage circuitry.

17. The data processing system of claim 16, wherein the first processing stage circuitry is configured to produce data in the form of plural blocks of data, where each block of data represents a particular region of an array of data.

18. The data processing system of claim 16, wherein the second processing stage circuitry is configured to use the data in the form of lines.

19. The data processing system of claim 16, wherein the first processing stage circuitry is configured to produce data in the form of lines.

20. The data processing system of claim 16, wherein the second processing stage circuitry is configured to use the data in the form of plural blocks of data, where each block of data represents a particular region of an array of data.

21. The data processing system of claim 16, wherein the first processing stage circuitry comprises a decoder configured to decode and/or decompress data so as to produce decoded and/or decompressed data according to the first pattern.

22. The data processing system of claim 16, wherein the first processing stage circuitry comprises rotation stage circuitry configured to rotate data so as to produce rotated data according to the first pattern.

23. The data processing system of claim 16, wherein:
the data processing system further comprises a memory; and
the first processing stage circuitry is configured to write the data according to the first pattern to the memory for use by the second processing stage circuitry.

24. The data processing system of claim 16, wherein:
the data processing system comprises a memory; and
the second processing stage circuitry is configured to use the data according to the second pattern by reading the data according to the second pattern from the memory.

25. The data processing system of claim 16, wherein the second processing stage circuitry is configured to use the data by causing at least some of the data and/or a processed version of at least some of the data to be displayed.

26. The data processing system of claim 16, wherein the data processing system is configured to re-activate the first processing stage circuitry before the second processing stage circuitry has used all of the set of data.

27. The data processing system of claim 16, wherein the data processing system is configured to re-activate the first processing stage circuitry when the time taken for the first processing stage circuitry to produce a further set of data is equal to or sufficiently similar to the time taken for the second processing stage circuitry to use remaining data of the set of data.

28. The data processing system of claim 27, wherein the data processing system is configured to re-activate the first processing stage circuitry when the time taken for the second processing stage circuitry to use remaining data of the set of data is less than or equal to the time taken for the first processing stage circuitry to produce a further set of data plus a margin.

29. The data processing system of claim 16, wherein the data processing system is configured to:
- determine a particular data position or positions of the set of data for re-activating the first processing stage circuitry; and
- re-activate the first processing stage circuitry when the second processing stage circuitry reaches the particular data position or positions of the set of data.

30. A data processing system comprising:
- first processing stage circuitry configured to produce a first set of data according to a first pattern, the first set of data comprising plural data positions; and
- second processing stage circuitry configured to use the first set of data according to a second different pattern;

wherein the data processing system is configured to:
- determine a particular data position or positions of the first set of data for activating the first processing stage circuitry to produce data, the set of data including sufficient data to allow the set of data to be used by the second processing stage according to the second pattern; and
- control the production of data by the first processing stage circuitry when the second processing stage circuitry reaches the particular data position or positions by activating the first processing stage circuitry when the second processing stage circuitry reaches the particular data position or positions of the set of data.

31. A non-transitory computer readable storage medium storing computer software code which when executing on a processor performs a method of operating a data processing system, the method comprising:
- a first processing stage of the data processing system producing data according to a first pattern; and
- a second processing stage of the data processing system using the data produced by the first processing stage according to a second different pattern;

the method further comprising the data processing system:
- producing by the first processing stage a set of data including sufficient data to allow the set of data to be used by the second processing stage according to the second pattern;
- deactivating the first processing stage following production of said set of data; and
- re-activating the first processing stage based on the use of the set of data by the second processing stage.

* * * * *